(12) United States Patent
Kato et al.

(10) Patent No.: US 7,585,807 B2
(45) Date of Patent: Sep. 8, 2009

(54) PRODUCTION OF CATALYST FOR REMOVAL OF INTROGEN OXIDES

(75) Inventors: Yasuyoshi Kato, Kure (JP); Naomi Imada, Kure (JP); Yoshinori Nagai, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 401 days.

(21) Appl. No.: 10/506,444

(22) PCT Filed: Feb. 28, 2003

(86) PCT No.: PCT/JP03/02326

§ 371 (c)(1),
(2), (4) Date: Feb. 4, 2005

(87) PCT Pub. No.: WO03/074170

PCT Pub. Date: Sep. 12, 2003

(65) Prior Publication Data

US 2005/0130836 A1   Jun. 16, 2005

(30) Foreign Application Priority Data

Mar. 1, 2002   (JP) ............................. 2002-056240

(51) Int. Cl.
*B01J 21/08* (2006.01)
*B01J 23/10* (2006.01)
(52) U.S. Cl. ..................... 502/242; 502/304
(58) Field of Classification Search ................. 502/304, 502/232, 237, 242, 254, 263, 305, 308, 309, 502/349, 350
See application file for complete search history.

(56) References Cited

U.S. PATENT DOCUMENTS

| 4,221,768 A | * | 9/1980 | Inoue et al. | 423/239.1 |
| 4,931,421 A | * | 6/1990 | Shibata | 502/439 |
| 5,087,600 A | * | 2/1992 | Kato et al. | 502/309 |

FOREIGN PATENT DOCUMENTS

| JP | 59-035026 | 2/1984 |
| JP | 8-257402 | 9/1996 |

* cited by examiner

*Primary Examiner*—Wayne Langel
*Assistant Examiner*—Brittany M Martinez
(74) *Attorney, Agent, or Firm*—Fay Sharpe LLP

(57) ABSTRACT

A method is disclosed for producing a $NO_x$ catalyst which includes dispersing a hydrated titanium dioxide or dried material, tungstic acid or a salt, and a sol-like material. The sol-like material is formed by dispersing cerium dioxide in a dispersion medium to form a catalyst slurry or paste. Supporting the catalyst slurry or paste is a catalyst carrier.

12 Claims, 1 Drawing Sheet

(a)

(b)

(a)  (b)

PRODUCTION OF CATALYST FOR REMOVAL OF INTROGEN OXIDES

TECHNICAL FIELD

The present invention relates to a catalyst used for removing nitrogen oxides (NOx) contained in an exhaust gas, a method for producing the catalyst, and a method for removing NOx. More specifically, the present invention relates to a catalyst used for removing NOx contained in an exhaust gas having a temperature of higher than 450° C., a method for producing the catalyst, and a method for removing NOx contained in an exhaust gas.

BACKGROUND ART

In the United Sates of America and the likes in which a large amount of electricity is consumed, the generation of electric power using the so-called simple cycle gas turbines, for which gas turbines are installed and operated independently, has been increased in order to supplement electricity and to cope with a time when the amount of electricity used becomes a peak. Since the equipments used for the electric power generation are constructed in suburbs of towns and cities, it is necessary to decompose NOx contained in exhaust gases at a high ratio to purify the gases. On the other hand, in the electric power generation using simple cycle gas turbines, it is necessary to install a denitrating apparatus just behind the exit of each gas turbine to treat an exhaust gas at a high temperature of 450° C. to 600° C. However, denitration catalysts having high performances and a long life at such a high temperature have not been obtained heretofore. Since the lowering of the activity of catalyst due to its deterioration by heat is remarkable especially at a high temperature region, it was necessary to treat an exhaust gas by using a catalyst having a low activity but an increased thermal resistance at the sacrifice of activity and packing the catalyst in an amount several times as large as that used for denitrating an exhaust gas discharged from a boiler and having a temperature of about 350° C. Accordingly, even in an equipment constructed to cope with a time when the amount of electricity used becomes a peak and having a short annual operation time, it is necessary to provide a large denitrating apparatus. Thus, it has come to a heavy burden on society even economically.

Accordingly, many inventions of catalysts which are hardly deteriorated at high temperatures have been made, and it has been known particularly that catalysts having cerium (Ce) as an active component exhibit comparatively high performances even at high temperatures. For instance, a catalyst which is prepared by coprecipitating a soluble titanium (Ti) compound, tungsten (W) compound, and cerium (Ce) compound so that the particles of cerium compound are highly dispersed in titania is disclosed in Laid-open Japanese Patent Publication No. Hei 08-257402. Further, for intending to increase the activity and stability of a catalyst prepared by dispersing Ce ions within micro voids of a zeolite by ion exchange method is disclosed in Laid-open Japanese Patent Publication No. Hei 08-27408. Whereas these catalysts have an excellent side from the purpose of increasing the stability and activity of catalyst by highly dispersing Ce, which is known as an active component of a catalyst for a long time, in the catalysts, they have problems remained to improve from the purpose of providing a catalyst having a high activity and an increased heat resistance at a high temperature region, pursued by the present inventors.

Among the conventional technologies described above, a method for preparing a catalyst by precipitating soluble compounds of Ti, W, and Ce by coprecipitation have problems as follows:

i) As a premise, Ti and Ce have the same valence of 4 and the compounds comprising one of both the elements, respectively, are ready to form a state wherein the compounds are uniformly dispersed in each other when they are mixed. Thus, when mixed, the compounds form a state wherein a large portion of a Ce compound (oxide) is embedded in a Ti compound (oxide) so that it is impossible to sufficiently exploit the excellent activity of the Ce compound. This conclusion can be inferred from the fact that the separation of both the compounds from each other is difficult and a Ce oxide remains in an industrial titanium oxide frequently in an amount of nearly 1% as impurity.

ii) A precipitate obtained by coprecipitation method presents a gel-like state and can hardly be subjected to filtration. Thus, it is necessary to pass the gel-like precipitate through many complicated steps by the time when the precipitate can actually be used as solid catalyst. Accordingly, the coprecipitation method has such a drawback that the production cost of a catalyst becomes high.

Besides, in a method in which Ce ions are highly dispersed within micro voids of a zeolite, whereas a catalyst having an extremely high initial performance can be obtained, the catalyst is easily deteriorated by the so-called de-aluminum phenomenon wherein the aluminum contained in a zeolite is separated from the zeolite structure into the micro voids of the zeolite. Since the de-aluminum phenomenon is accelerated especially by a high ambient temperature and the presence of steam, when the catalyst is used for a denitration at a high temperature wherein the catalyst is exposed to an exhaust gas containing 5 to 10% of steam for many hours, it is difficult to maintain a high activity of the catalyst for a long period of time.

In consideration of the problems existing in the prior arts, the subject matters of the present invention is to provide a denitrating catalyst in which a Ce oxide is prevented from being embedded in a Ti oxide to realize such a high degree of dispersion of the Ce oxide on the surface of the Ti oxide as comparable with the case wherein cerium ions are dispersed within micro voids of a zeolite by ion exchange method, and which catalyst is free from occurring such phenomena as sintering of the Ti oxide and deterioration of the zeolite with steam. For instance, the present invention is to provide a method by which NOx contained in a high temperature exhaust gas exhausted from such an equipment as that for electric power generation using simple cycle gas turbines is treated to render into harmless.

DISCLOSURE OF THE INVENTION

As a result of repeated diligent researches conducted by the present inventors to develop a catalyst containing a titanium oxide as a main component and having a greatly increased heat resistance as well as activity, the following conclusions were drawn:

i) In order to greatly increase the activity of the catalyst, it becomes an efficient measure to highly disperse Ce ions or oxide in micro voids, for example, micro voids of a zeolite, thereby increase the contact of the Ce ions or oxide with an exhaust gas.

ii) When a Ti compound and a Ce compound are mixed under a condition wherein the compounds can easily be blended with a high degree of dispersion, the blending proceeds too far so that the Ce compound is embedded in the Ti compound (for example, $TiO_2$) since both the compounds have some similarities in properties between them. Thus, the contact of the Ce compound with an exhaust gas is impeded and the Ce compound does not function as active component. Not only that, sintering of $TiO_2$ is accelerated sometimes by the Ce compound. Therefore, the mixture is not suitable for a catalyst to be used at a high temperature.

Then, diligent researches were further continued by the present inventors, and as a result, such facts as follows were found, leading to the accomplishment of the present invention:

That is, when $TiO_2$ having hydroxyl groups on its surface is mixed with tungstic acid or a salt thereof in the presence of water, the hydroxyl groups of the $TiO_2$ are condensed with the tungstic acid or a salt thereof to form bridges between crystals of the $TiO_2$. When the crystals are calcined, micro voids having a diameter of less than 50 Å comparable with the micro voids in a zeolite are formed as shown in FIG. 1(a). In a case wherein a titanium oxide having such micro voids is formed, when a sol of $CeO_2$ which has a size of fine particle but can not be penetrated into the interior of the $TiO_2$ is coexisted, the $CeO_2$ enters as an active component into the micro voids formed between crystals of $TiO_2$ separated by a W compound as shown in FIG. 1(b), and thus a high heat resistance and a high activity are imparted to a catalyst to be obtained.

In the catalyst of the present invention, crystals of $TiO_2$ are oriented and cohered while holding tungstic acid or tungsten trioxide ($WO_3$) in between the crystals to form micro voids and particles of Ce oxide (which is an active component) in the gaps (or spaces) between the $TiO_2$ crystals as described in the diagram of a catalyst shown FIG. 1(b), thereby prevent the $TiO_2$ crystals from contacting with one another to impede the growth of the $TiO_2$ crystals by heat, and achieve a high activity of a catalyst comparable with a zeolite in which Ce ions are dispersed by ion exchange method, and further completely prevent such zeolite from being deteriorated when exposed at a high temperature to a gas containing steam.

In the present invention, it is necessary that particles of Ce compound which is an active component exist in the gaps between crystals of $TiO_2$ as shown in FIG. 1(b). On the contrary, when $TiO_2$ and Ce oxide are mixed under a condition wherein the compounds are in a state of soluble salt or ion having a high reactivity, the Ce oxide becomes in a state wherein the particles of Ce oxide are embedded in the $TiO_2$ so that the particles of Ce oxide can not exist within the micro voids. Thus, only a catalyst having low performances can be obtained.

The present invention is summarized as follows:
(1) A method for producing a catalyst used for removing nitrogen oxides which method comprises dispersing a hydrated titanium oxide or dried material thereof, tungstic acid or a salt thereof, and cerium dioxide in a dispersion medium to form a sol-like material, mixing the sol-like material with an aqueous medium to form a catalyst slurry or paste, supporting the catalyst slurry or paste on a catalyst carrier, and then calcinating the catalyst carrier.
(2) The method for producing a catalyst used for removing nitrogen oxides recited in paragraph (1) above wherein a colloidal silica is further mixed to form the catalyst slurry or paste.
(3) The method for producing a catalyst used for removing nitrogen oxides recited in paragraph (1) or (2) above wherein oxalic acid is still further mixed to form the catalyst slurry or paste.
(4) The method for producing a catalyst used for removing nitrogen oxides recited in any one of paragraphs (1) to (3) above wherein inorganic short fibers are still further mixed to form the catalyst slurry or paste.
(5) The method for producing a catalyst used for removing nitrogen oxides recited in any one of paragraphs (1) to (4) above wherein the catalyst carrier is a catalyst carrier made of inorganic fibers, a catalyst carrier made of a ceramic, or a catalyst carrier made of a metal.
(6) The method for producing a catalyst used for removing nitrogen oxides recited in paragraph (5) above wherein-the catalyst carrier made of inorganic fibers is a corrugated honeycomb carrier prepared by subjecting a sheet of silica-alumina type inorganic fibers to a corrugating processing.
(7) The method for producing a catalyst used for removing nitrogen oxides recited in paragraph (5) above wherein the catalyst carrier made of a metal is a metal lath.
(8) A catalyst used for removing nitrogen oxides which catalyst is produced by a method recited in any one of paragraphs (1) to (7) above.
(9) A method for removing nitrogen oxides from an exhaust gas containing the nitrogen oxides by using a catalyst recited in paragraph (8) above in the presence of ammonia.
(10) The method for removing nitrogen oxides recited in paragraph (9) above wherein the temperature of the exhaust gas is 350 to 600° C.
(11) The method for removing nitrogen oxides recited in paragraph (9) above wherein the exhaust gas is an exhaust gas exhausted from a gas turbine.

Typically, the catalyst of the present invention can be prepared as follows; i) an oxo-acid of tungsten (W) or its salt, and cerium dioxide are dispersed in a slurry of a hydrated titanium oxide such as metatitanic acid and orthotitanic acid, its dried material, or a colloid such as a titania sol by an aqueous medium to form a sol, ii) a pH adjustor such as oxalic acid and acetic acid, and a binder such as a silica sol are added to the sol formed in i) above when necessary, iii) the sol is mixed with an aqueous medium to convert into a slurry or paste (hereinafter referred to as catalyst slurry or catalyst paste), iv-a) a honeycomb-like catalyst carrier prepared by subjecting an inorganic fiber sheet to corrugating processing, a catalyst carrier comprising a non-woven fabric sheet made of inorganic fibers, a honeycomb-like catalyst carrier made of a ceramic such as cordierite and alumina, a catalyst carrier comprising a net-like material such as a wire netting and metal lath, or a catalyst carrier comprising a net-like material prepared by weaving inorganic fiber yarns such as E-glass fiber yarns into a net-like structure is impregnated with the catalyst slurry or catalyst paste, iv-b) the catalyst slurry or catalyst paste is applied on the catalyst carrier, or iv-c) the catalyst slurry or catalyst paste is applied heavily on the net-like carrier and pressed so that the catalyst slurry or catalyst paste fills the meshes of the net, and then v) the catalyst carrier is dried and calcined.

A raw material for a titanium oxide used in the present invention may be any material so long as it has hydroxyl groups on the surface of titanium oxide, and specifically, a hydrated titanium oxide, a sol-like material of a titanium oxide, and a dried material thereof can be used. As further example, the raw material may be one containing sulfuric acid radical as impurity, like a dried material prepared from metatitanic acid obtained by "sulfuric acid process".

As a raw material for tungsten (W), an oxo-acid or heteropolyacid containing $MO_4$ type ion (M:W) of a corresponding metal (M), or an ammonium salt such as ammonium meta- or para-tungstate can be used. The amount of the raw material for tungsten to be added is 1 to 20 atom % and preferably 5 to 15 atom % of a catalyst. When the amount of tungsten to be added is small, deterioration in the heat resistance of a catalyst is caused, but when the amount is too large, the percentage of titanium oxide used for maintaining the active component is decreased to produce the lowering of the activity of a catalyst.

On the other hand, a sol-like material of a cerium oxide is a dispersion of $CeO_2$ dispersed in water containing an organic alkali or acid as stabilizer, and a sol-like material currently on the market as a UV stabilizer or coating agent may also be used. Its amount to be added is 0 to 10 atom % and preferably in the range of 1 to 5 atom % of a catalyst. When its amount to be added is too small, it is difficult to obtain a catalyst having a high activity, but when the amount is too large, deterioration in the activity of a catalyst at a temperature higher than 500° C. tends to be caused.

Whereas the addition of oxalic acid or acetic acid is not necessarily required, they are added as occasion arises, when ammonim salt of tungstic acid is used, since the acid reacts with ammonium ion to form tungstic acid and accelerate the adsorption of tungstic acid to titanium oxide. Particularly, since oxalic acid has a property of slightly dissolving titanium oxide and activating the surface of titanium oxide to accelerate the reaction with tungstic acid, it is easy to obtain a preferable result when 5 to 10% by weight of oxalic acid based on the weight of titanium oxide is added.

As a catalyst carrier for supporting a catalyst slurry or paste containing the compounds described above, a honeycomb-like carrier prepared by subjecting an inorganic fiber sheet to a corrugating processing, non-woven fabric made of inorganic fibers, net-like material such as a wire netting and metal lath, net-like product prepared by weaving inorganic fiber yarns such as E-glass fiber yarns into a net-like structure, and the like may be used as described above, and the carriers may be used after reinforced by a known reinforcing agent, or after provided with a coated layer effecting the purposes of increasing the adhesibility of catalyst components and preventing a metal substrate from being oxidized.

While the method for supporting a catalyst slurry or paste may be any one, it is appropriate for a corrugated honeycomb made of inorganic fibers, ceramic non-woven fabric, and ceramic honeycomb carrier to immerse the carrier in a slurry containing 30 to 50% by weight of catalyst components so that the catalyst slurry is filled in the gaps between fibers and coated on the surface of the carrier. On the other hand, in the case wherein a metal or ceramic net-like product is used, when the size of its meshes is small, a method in which a paste prepared by adding inorganic fibers in a catalyst paste containing 30 to 35% by weight of water is applied on the net-like product by using a roller so as to fill the meshes can be adopted in addition to the coating method described above.

A catalyst precursor prepared by one of the methods described above and supporting a catalyst slurry or catalyst paste on a various type of substrate is dried by a known method such as air-drying and hot-air drying, after subjected to treatments such as cutting, shaping, and deformation when necessary, and then calcined at a temperature of 500 to 700° C. and used as catalyst.

The catalyst of the present invention is preferably used for removing NOx from a high temperature exhaust gas, for example, an exhaust gas having a temperature of 350 to 600° C., desirably 450 to 600° C., and most preferably 500 to 600° C.

BEST MODE FOR CARRYING OUT THE INVENTION

EXAMPLES

Figure 1:
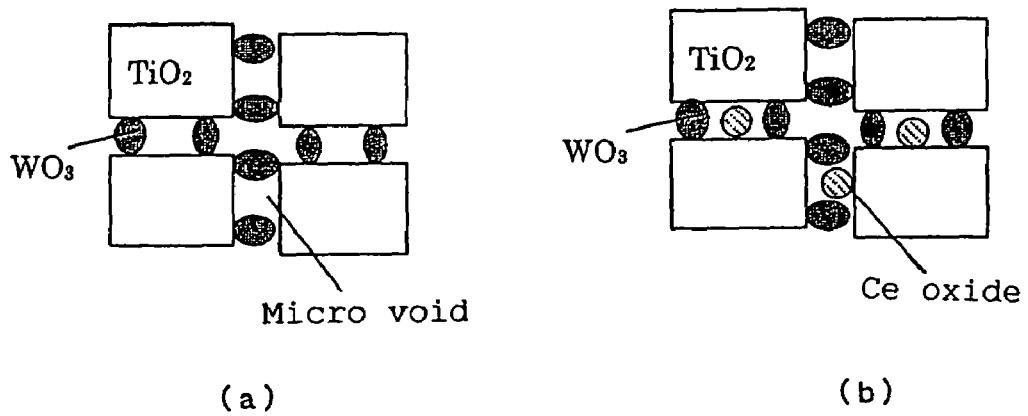
FIG. 1 is a diagram for illustrating a catalyst structure by which the concept of the present invention is made concrete.
Figure 2:
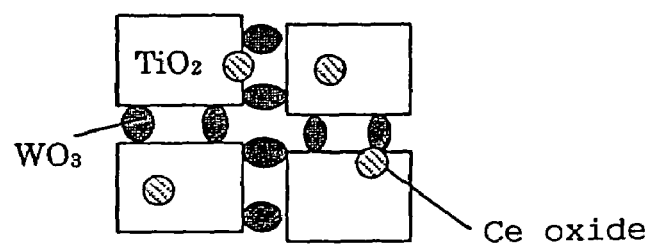
FIG. 2 is a diagram for illustrating the structure of a conventional catalyst.

Now, the present invention will be described in more detail with reference to specific examples. However, it should be understood that the scope of the present invention is by no means limited by such specific-examples.

Example 1

Titanium oxide dried at a low temperature (produced by Millennium Co., Ltd., trade name: G5, surface area: 275 m²/g) in an amount of 80 g, 52.7 g of aqueous solution of ammonium metatungstate $((NH_4)_6.H_2W_{12}O_{40}.xH_2O$, contained in the solution at a concentration of 50% by weight as $WO_3$), 26.2 g of $CeO_2$ sol (produced by Taki Chemical Co., Ltd., trade name: Needrahl, $CeO_2$ content: 15% by weight, 4 g of oxalic acid, 50 g of silica sol (produced by Nissan Chemical Ind., trade name: OS sol, concentration: 20% by weight), and 50 g of water were mixed to prepare a catalyst slurry having a concentration of $TiO_2$ of 30% by weight.

In the catalyst slurry thus obtained was immersed a corrugated honeycomb made of aluminosilicate type inorganic fibers (produced by Nichias Co., Ltd, trade name: No. 3722) and cut into 5 cm square so that the catalyst slurry was supported between the inorganic fibers and on the surface of the fibers, dried at 150° C., and then calcined at 600° C. for 2 hours to prepare a catalyst.

In this case, the amount of the catalyst supported was 300 g/L, and the catalyst had a chemical composition of Ti/W/Ce (88/10/2) in terms of atom percentage.

Examples 2 and 3

Catalysts were prepared by the same method as in Example 1 with the exception that the amounts of aqueous solution of ammonium metatungstate and $CeO_2$ sol added were changed respectively to 83.8 g and 27.6 g (Example 2), or 24.9 g and 24.8 g (Example 3) but the catalyst slurries maintained a $TiO_2$ concentration of about 30% by weight by adjusting the amount of water to be added in both Examples.

The catalysts thus obtained had chemical compositions of Ti/W/Ce (83/15/2 in Example 2 and 93/5/2 in Example 3) in terms of atom percentage, respectively.

Examples 4 through 6

Catalysts were prepared by the same method as in Example 1 with the exception that the amounts of aqueous solution of ammonium metatungstate and $CeO_2$ sol added were changed respectively to 52.1 g and 12.9 g (Example 4), 53.3 g and 39.7 g (Example 5 ), or 54.9 g and 67.8 g (Example 6 ) but the catalyst slurries maintained a $TiO_2$ concentration of about 30% by weight by adjusting the amount of water to be added in each Example.

The catalysts thus obtained had chemical compositions of Ti/W/Ce (89/10/1 in Example 4, 87/10/3 in Example 5, and 85/10/5 in Example 6 ) in terms of atom percentage, respectively.

Comparative Example 1

A catalyst was prepared by the same method as in Example 1 with the exception that $CeO_2$ sol was not added.

Comparative Example 2

A catalyst having a chemical composition of Ti/W/Ce (88/10/2) in terms of atom percentage was prepared by the same method as in Example 1 with the exception that the $CeO_2$ sol in Example 1 was replaced by 9.9 g of cerium nitrate ($Ce(NO_3)_3 \cdot 6H_2O$).

Comparative Example 3

Hydrogen substitution type mordenite (produced by Tosoh Corp., Si/Al ratio: 23.1) in an amount of 100 g and 9.3 g of cerium nitrate ($Ce(NO_3)_3 \cdot 6H_2O$) were dispersed in 200 g of water, and the dispersion was subjected to evaporation to dryness on a sand bath and then to calcination at 550° C. for 2 hours to prepare a Ce substitution type mordenite (Ce ion 3% by weight). The powders of Ce substitution type mordenite thus obtained was dispersed in a mixed solution of 10 ng of silica sol (produced by Nissan Chemical Ind., trade name: OS sol, concentration: 20% by weight) and 10 ng of water to prepare a catalyst slurry. In the catalyst slurry thus obtained was immersed a corrugated honeycomb made of aluminosilicate type inorganic fibers (produced by Nichias Co., Ltd, trade name: No. 3722) and cut into 5 cm square so that the catalyst slurry was supported between the inorganic fibers and on the surface of the fibers, dried at 150° C., and then calcined at 600° C. for 2 hours to prepare a catalyst.

With the catalysts prepared in Example 1, and Comparative Examples 1 through 3, denitration ratios from an exhaust gas in the coexistence of ammonia under conditions shown in Table 1 at temperatures from 350 to. 600° C. were determined, respectively.

TABLE 1

| Item | Value |
| --- | --- |
| 1. Space velocity SV | 60,000 l/h |
| 2. Gas composition | |
| $NH_3$ | 240 ppm |
| NO | 200 ppm |
| $O_2$ | 10% |
| $CO_2$ | 5% |
| $H_2O$ | 5% |

Figure 3:
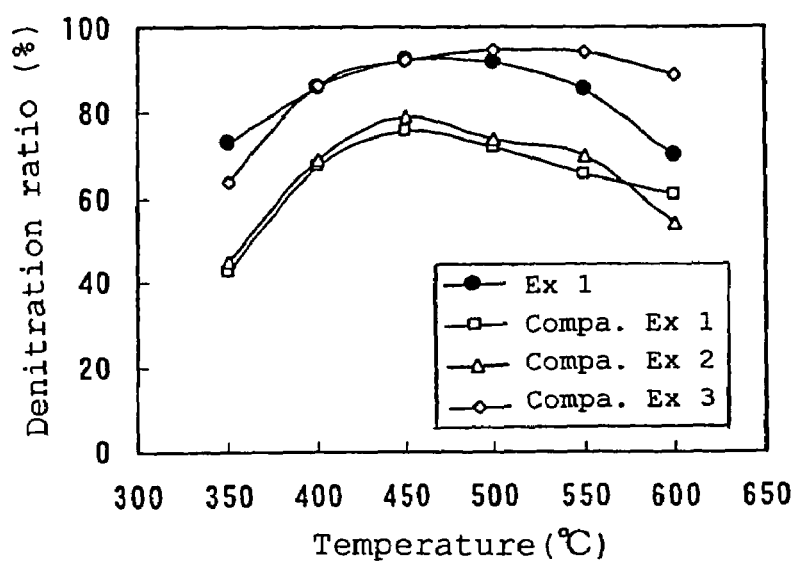
FIG. 3 is a graph in which the denitration ratios obtained by using an example of the catalyst of the present invention and catalysts of Comparative Examples are compared to show an effect of the present invention.

The results thus obtained are shown in FIG. 3. From the results shown in FIG. 3, it can be understood that the catalyst prepared in Example 1 of the present invention has an extremely high performance compared with the catalyst having a chemical composition of Ti/W and prepared in Comparative Example 1 and the catalyst prepared in Comparative Example 2 wherein cerium nitrate was used as raw material for Ce, and has a high activity comparable with the performance of the Ce substitution type zeolite prepared in Comparative Example 3.

On the other hand, with the catalysts prepared in Examples 1 through 6 and Comparative Examples 1 through 3, heat resistance tests wherein sample catalysts are maintained in the atmosphere at 550° C. for 200 hours, and steam resistance tests wherein sample catalysts are maintained in a gas containing 30% of $H_2O$ and shown in Table 2 at 550° C. for 200 hours were carried out. With the catalysts after these tests, denitration ratios were determined under the conditions shown in Table 1. Among the performances (denitration ratios) obtained, the values determined at the initial stage, after the heat resistance tests, and after the steam resistance tests at 550° C., respectively, are shown in Table 3 for comparison.

TABLE 2

| Item | Value |
| --- | --- |
| 1. Space velocity SV | 60,000 l/h |
| 2. Gas composition | |
| $O_2$ | 20% |
| $H_2O$ | 30% |

TABLE 3

| Catalyst | Initial stage | After heat resistance test | After steam resistance test |
| --- | --- | --- | --- |
| Example 1 | 85.6 | 83.2 | 84.5 |
| Example 2 | 79 | 79.2 | 79.7 |
| Example 3 | 82.1 | 82.7 | 82.9 |
| Example 4 | 83.1 | 81.4 | 82 |
| Example 5 | 80.5 | 79.8 | 78.8 |
| Example 6 | 78 | 78.1 | 77.9 |
| Comparative Example 1 | 65.6 | 63.2 | 63.5 |
| Comparative Example 2 | 70.1 | 71.3 | 69.4 |
| Comparative Example 3 | 93.8 | 91.5 | 32.2 |

As will be clear from Table 2 and Table 3, the catalysts prepared in Examples 1 through 6 of the present invention are not only high in their performances compared with those of the catalysts prepared in Comparative Examples 1 and 2, but also have excellent durability of causing almost no deterioration in the activity by subjecting the catalysts to the heat resistance tests and steam resistant tests. In contrast, whereas the Ce substitution type mordenite catalyst prepared in Comparative Example 3 had values as excellent as the catalysts of the present invention in the initial performance and after heat resistance test, the catalyst of Comparative Example 3 remarkably lowered in the activity not only to show an extremely low value compared with the catalysts of the Examples of the present invention but also to show the lowest value in the catalysts of Comparative Examples after the steam resistance test. From these results, it can be said that the catalysts of the present invention not only have a high denitration performance at high temperatures but also are excellent in heat resistance and steam resistance, demonstrating the effectiveness of the concept of the present invention.

On the other hand, when the results obtained in Examples 1, 2, and 3 are compared, it can be understood that the performance (denitration ratio) of a catalyst tends to somewhat decrease when the content of W in a catalyst is small or too large. Further, from the comparison of the results obtained in Example 1, and 4 through 6, it can be seen that when the amount of Ce added is too large, heat resistance of a catalyst tends to decrease and the amount of Ce to be added is preferably less than 5 atom percentage.

Example 7

Titanium oxide (produced by Ishihara Sangyo, specific surface area: 250 $m^2/g$) in an amount of 15 kg, 9.7 kg of ammonium metatungstate, 4 kg of $CeO_2$ sol, 0.8 kg of oxalic acid, and 2 kg of water were charged into a kneader, kneaded for 20 minutes, and further kneaded for 30 minutes while gradually adding 4 kg of silica-alumina type ceramic fibers (produced by Toshiba Corp., trade name: Fineflex) thereto to obtain a catalyst paste having a water content of 32%. The catalyst paste thus obtained was placed on the surface-of a substrate prepared by subjecting a SUS304 steel plate having a thickness of 0.2 mm to metal lath processing, held between two polyethylene sheets, and then passed through a pair of press rollers so that the catalyst paste was filled in meshes and applied on the surface of the metal lath substrate. The substrate was air dried and then calcined at 600° C. for 2 hours to obtain a plate-like catalyst.

When the catalyst thus obtained was subjected to determination of denitration ratio under a condition of aerial velocity of 51 m/h at 550° C., the nitration ratio was 75%. This value corresponds to 83% of denitration ratio at a SV of 60,000 1/h obtained in Example 1 and shows that the catalysts prepared according to the method of the present invention have high performances at high temperatures despite the method for supporting a catalyst on a carrier.

INDUSTRIAL APPLICABILITY

According to the invention defined in any one of claims 1 through 7, a catalyst can be obtained which is used for removing nitrogen oxides, has a high activity and heat resistance, and makes efficient removal of NOx contained in a high temperature exhaust gas such as an exhaust gas from a gas turbine having no HRSG (heat recovery steam generator) for purifying the exhaust gas possible. Besides, in the method of the present invention for producing a catalyst, such a complicated step as coprecipitation is not required in precipitating operation, and the catalyst can be obtained through extremely small number of steps of supporting a catalyst slurry or paste on a variety of carrier after blending catalyst raw materials. This fact leads to a social effect of producing a low-priced but excellent apparatus for purifying an exhaust gas to contribute to the improvement of environment.

According to the invention defined in claim 8, a compact denitrating apparatus can be realized by using a catalyst having a high activity, and it is possible to decrease the size of a reactor made of expensive highly heat resistant material and to save the weight of the reactor.

According to the invention defined in any one of claims 9 through 11, it is possible to efficiently remove nitrogen oxides from a high temperature exhaust gas.

The invention claimed is:

1. A method for producing a catalyst for removing nitrogen oxides which comprises dispersing a hydrated titanium oxide or dried material thereof, tungstic acid or a salt thereof, and a sol-like material formed by dispersing cerium dioxide in a dispersion medium with an aqueous medium to form a catalyst slurry or paste, supporting the catalyst slurry or paste on a catalyst carrier, and then calcinating the carrier.

2. The method for producing a catalyst for removing nitrogen oxides according to claim 1 wherein a colloidal silica is further mixed to form the catalyst slurry or paste.

3. The method for producing a catalyst for removing nitrogen oxides according to claim 1 wherein oxalic acid is still further mixed to form the catalyst slurry or paste.

4. The method for producing a catalyst for removing nitrogen oxides according to claim 1 wherein inorganic short fibers are still further mixed to form the catalyst slurry or paste.

5. The method for producing a catalyst for removing nitrogen oxides according to claim 1 wherein the catalyst carrier is an inorganic fiber catalyst carrier, ceramic catalyst carrier, or metal catalyst carrier.

6. The method for producing a catalyst for removing nitrogen oxides according to claim 5 wherein the inorganic fiber catalyst carrier is a corrugated honeycomb carrier prepared by subjecting a sheet of silica-alumina type inorganic fibers to a corrugating processing.

7. The method for producing a catalyst for removing nitrogen oxides according to claim 5 wherein the metal catalyst carrier is a metal lath.

8. A catalyst for removing nitrogen oxides comprising particles of titanium dioxide, tungsten trioxide and cerium dioxide supported on a catalyst carrier, and
    wherein particles of titanium dioxide are oriented and cohered while holding particles of tungsten trioxide in between the titanium dioxide particles to form micro voids, and
    wherein particles of cerium dioxide are coexisted with the tungsten trioxide in the gaps between the titanium dioxide particles.

9. The catalyst of claim 8, wherein silica is further contained in the catalyst.

10. The catalyst of claim 8, wherein the catalyst carrier is selected from a group consisting of an inorganic fiber catalyst carrier, a ceramic catalyst carrier, and a metal catalyst carrier.

11. The catalyst of claim 10, wherein the inorganic fiber catalyst carrier is a corrugated honeycomb carrier prepared by subjecting a sheet of silica-alumina type inorganic fibers to a corrugating process.

12. The catalyst of claim 10, wherein the metal catalyst carrier is a metal lath.

* * * * *